(12) United States Patent
Li

(10) Patent No.: US 11,300,277 B2
(45) Date of Patent: Apr. 12, 2022

(54) ASSEMBLY COMPONENT AND LAMP

(71) Applicant: OPPLE LIGHTING CO., LTD., Shanghai (CN)

(72) Inventor: Shuchao Li, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/990,147

(22) Filed: Aug. 11, 2020

(65) Prior Publication Data

US 2021/0048175 A1 Feb. 18, 2021

(30) Foreign Application Priority Data

Aug. 13, 2019 (CN) .......................... 201921310052.3

(51) Int. Cl.
| | |
|---|---|
| *F21V 21/04* | (2006.01) |
| *F21V 17/16* | (2006.01) |
| *F16B 21/08* | (2006.01) |
| *F21V 19/00* | (2006.01) |
| *F16B 21/06* | (2006.01) |
| *F16B 21/07* | (2006.01) |

(52) U.S. Cl.
CPC ............ *F21V 21/044* (2013.01); *F21V 17/16* (2013.01); *F21V 17/164* (2013.01); *F16B 21/06* (2013.01); *F16B 21/07* (2013.01); *F16B 21/08* (2013.01); *F21V 17/162* (2013.01); *F21V 17/166* (2013.01); *F21V 17/168* (2013.01); *F21V 19/004* (2013.01); *F21V 19/0035* (2013.01); *F21V 19/0045* (2013.01); *F21V 21/045* (2013.01)

(58) Field of Classification Search
CPC ...... F21V 17/16; F21V 17/162; F21V 17/164; F21V 17/166; F21V 17/168; F21V 19/0035; F21V 19/004; F21V 19/0045; F21V 21/044; F21V 21/045; F16B 21/06; F16B 21/07; F16B 21/08
See application file for complete search history.

(56) References Cited

U.S. PATENT DOCUMENTS

| | | | |
|---|---|---|---|
| 2011/0058387 A1* | 3/2011 | Matsunaga | ........... F21V 17/164 362/547 |
| 2014/0009907 A1* | 1/2014 | Wu | ........ F16B 5/0088 362/97.1 |

(Continued)

FOREIGN PATENT DOCUMENTS

DE 202013100626 U1 * 5/2014 ............. F21S 8/026

*Primary Examiner* — Alexander K Garlen
*Assistant Examiner* — Colin J Cattanach
(74) *Attorney, Agent, or Firm* — Arch & Lake LLP

(57) ABSTRACT

The present disclosure relates to an assembly component, a lamp and a method of manufacturing an assembly component. The assembly component includes a first element and a second element, the first element includes a first main body and a first elastic engaging portion which are connected to each other; the second element includes a second main body and a second engaging portion; the second main body has a moving space; a bottom wall of the moving space forms a clamping surface, the second engaging portion is connected to a side wall of the moving space, the first elastic engaging portion is clamped between the second engaging portion and the clamping surface, and the clamping surface limits the first elastic engaging portion in an outward direction.

20 Claims, 10 Drawing Sheets

(56) References Cited

U.S. PATENT DOCUMENTS

2015/0167953 A1* 6/2015 Huang ................ F21V 19/0035
362/294
2018/0306417 A1* 10/2018 McCane ................ F21K 9/275
2019/0056098 A1* 2/2019 Blake .................... F21V 19/003

* cited by examiner

ASSEMBLY COMPONENT AND LAMP

CROSS-REFERENCE TO RELATED APPLICATIONS

This application is based upon and claims the priority of Chinese Patent Application No. 201921310052.3 filed on Aug. 13, 2019, the entire content of which is hereby incorporated by reference herein for all purposes.

TECHNICAL FIELD

The present disclosure relates to the technical field of lighting, and in particular to an assembly component and a lamp.

BACKGROUND

When disassembling two parts of a lamp components, the disassembly can be divided into damaged disassembly and non-damaged disassembly according to the damage. Damaged disassembly means that when two parts are disassembled, one of them is damaged. Non-damaged disassembly means that when two parts are disassembled, both parts are undamaged. Disassembly here refers to releasing the connection between two parts, so that two parts can be directly separated by pulling them.

SUMMARY

The present disclosure provides an assembly component, a lamp and a method of manufacturing an assembly component According to a first aspect, an assembly component is provided. The assembly component may include a first element where the first element may include a first main body and a first elastic engaging portion which are connected to each other; and a second element where the second element may include a second main body and a second engaging portion.

The second main body may have a moving space, a bottom wall of the moving space may form a clamping surface, the second engaging portion may be connected to a side wall of the moving space, the first elastic engaging portion may be clamped between the second engaging portion and the clamping surface, and the clamping surface may limit the first elastic engaging portion in an outward direction.

According to a second aspect, a lamp is provided. The lamp may include a lamp shell, a light source component and an assembly component. The assembly component may include a first element where the first element may include a first main body and a first elastic engaging portion which are connected to each other; and a second element where the second element may include a second main body and a second engaging portion.

The second main body may have a moving space, a bottom wall of the moving space may form a clamping surface, the second engaging portion may be connected to a side wall of the moving space, the first elastic engaging portion may be clamped between the second engaging portion and the clamping surface, and the clamping surface may limit the first elastic engaging portion in an outward direction.

The assembly component and the light source component may be both disposed in an inner cavity of the lamp shell.

According to a third aspect, a method of manufacturing an assembly component is provided. The method may include providing a first element, and connecting a first main body of the first element and a first elastic engaging portion of the first element; providing a second element where the second element may include a second main body and a second engaging portion; providing a moving space for the second main body; forming a clamping surface using a bottom wall of the moving space; connecting the second engaging portion to a side wall of the moving space; clamping the first elastic engaging portion between the second engaging portion and the clamping surface; and limiting the first elastic engaging portion in an outward direction by using the clamping surface.

It is to be understood that both the foregoing general description and the following detailed description are exemplary and explanatory only and are not restrictive of the present disclosure.

BRIEF DESCRIPTION OF THE DRAWINGS

The accompanying drawings are merely for the purpose of illustrating the examples and are not to be construed as any limitation to the present disclosure. The same reference numerals throughout the accompanying drawings are used to indicate the same parts.

DETAILED DESCRIPTION

Figure 1:
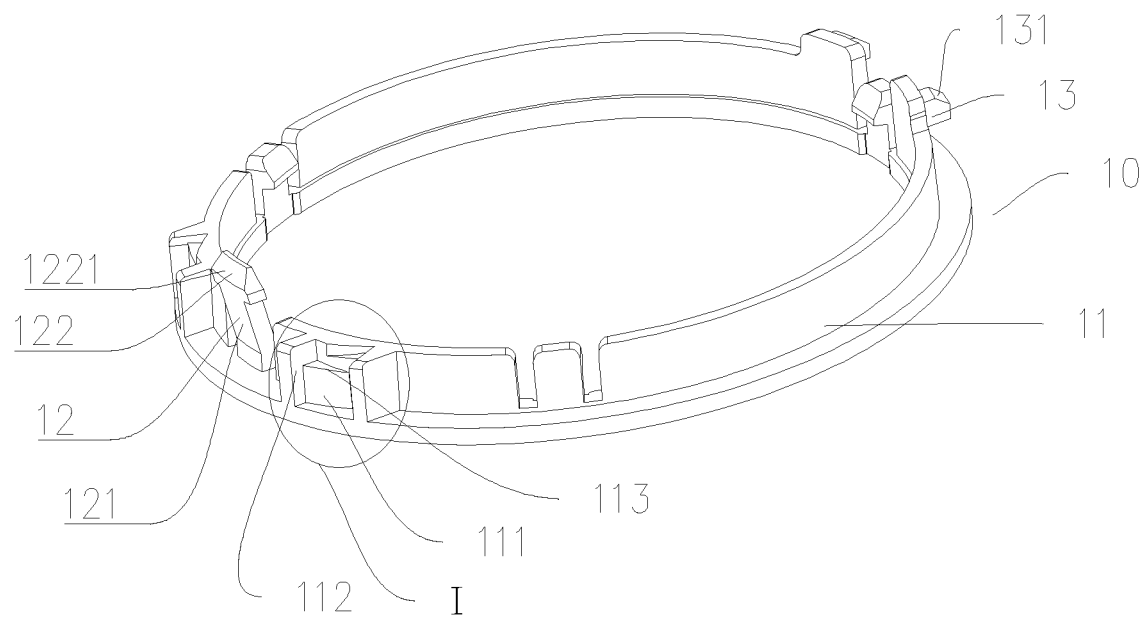
FIG. 1 is a stereoscopic view of a first element of the first example of the present disclosure.

Examples of the disclosure are described below with reference to the drawings in detail. Although the examples of the disclosure are shown in the drawings, it should be understood that the disclosure may be implemented in various forms without limitation of the examples elaborated here.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference numerals referred in this disclosure include: first element 10, first main body 11, limiting space 111, blocking wall 112, limiting step 113, first step 113a, second step 113b, third step 113c, first guide side surface 113a2, first guide bottom surface 113b1, second guide side surface 113b2, second guide bottom surface 113c1, first limiting side surface 113c2, first elastic engaging portion 12, main body 121, convex portion 122, second inclined surface 1221, first pre-connection portion 13, third inclined surface 131, second element 20, second main body 21, accommodation cavity 211, clamping surface 212, first inclined surface 2121, moving space 213, deformation space 214, second engaging portion 22, elastic body 221, second pre-connection portion 23, elastic limiting arm 24, rear shell 101, mounting cavity 1011, first clamping portion 1012, front shell 102, second clamping portion 1021, limiting surface 1022 and light outlet 1023.

When disassembling parts of lamp components, some disassembly between two parts belongs to damaged disassembly or the disassembly is difficult, which may need disassembled by tools. The operation directions of assembly and disassembly between the two parts are sometimes opposite, which thus increases the requirement for operation space.

Figure 4:
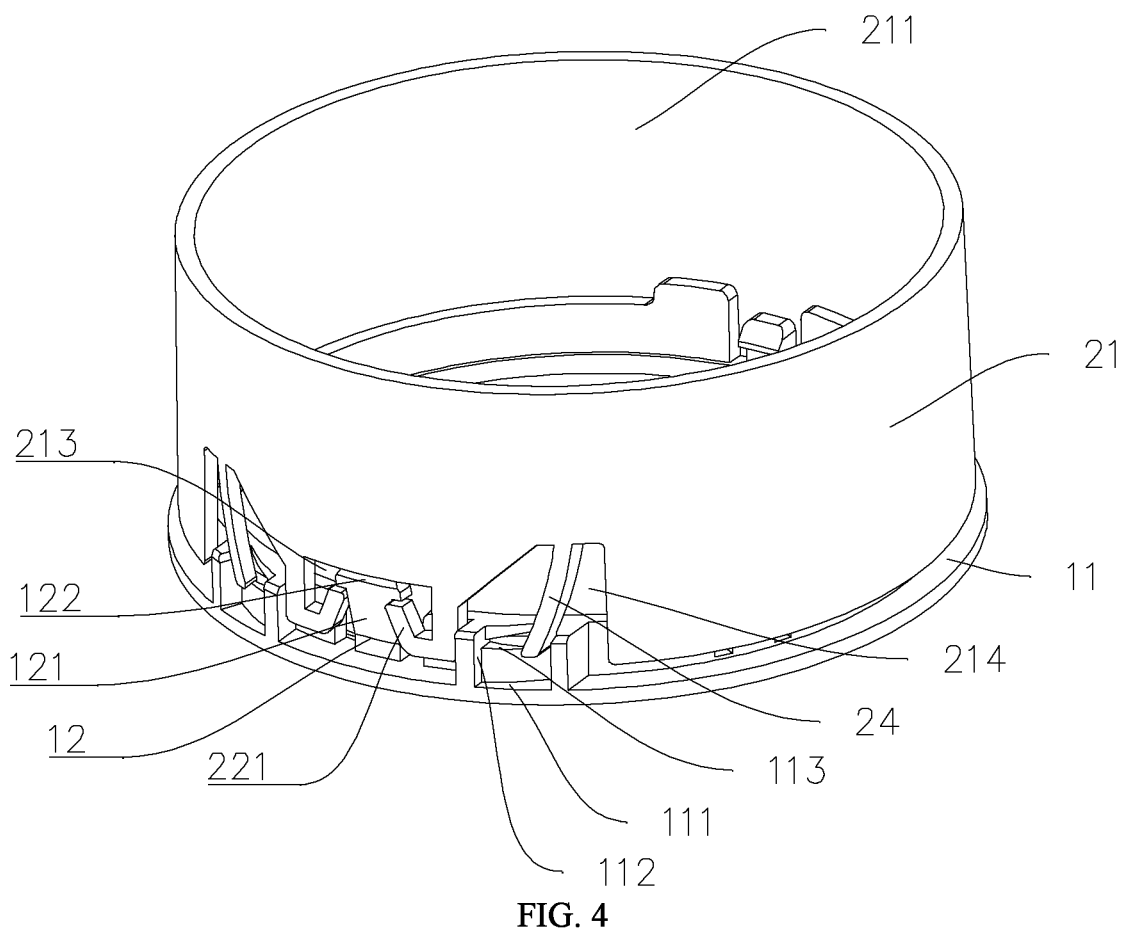
FIG. 4 is a stereoscopic view of an assembly component of the first example of the present disclosure.

As illustrated in FIG. 4, this example discloses an assembly component, the assembly component includes a first element 10 and a second element 20. The first element 10 includes a first main body 11 and a first elastic engaging portion 12 which are connected to each other. The second element 20 includes a second main body 21 and a second engaging portion 22 which are connected to each other. The second main body 21 has a moving space 213. A bottom wall of the moving space 213 forms a clamping surface 212, the second engaging portion 22 is connected to a side wall of the moving space 213, the first elastic engaging portion 12 is clamped between the second engaging portion 22 and the clamping surface 212, and the clamping surface 212 limits the first elastic engaging portion 12 in an outward direction.

When assembling the first element 10 and the second element 20, the first element 10 is pushed upward and then the first elastic engaging portion 12 moves upward until the first elastic engaging portion 12 is clamped between the second engaging portion 22 and the clamping surface 212, thus completing the assembly of the first element 10 and the second element 20. When disassembling the first element 10 and the second element 20, the first element 10 is pushed upward continuously, and under the limiting action of the clamping surface 212, the first elastic engaging portion 12 moves inward and upward and then moves away from a space between the second engaging portion 22 and the clamping surface 212, thus completing the separation of the first element 10 and the second element 20. An assembly direction and a disassembly direction of the assembly component in this example are the same, so that the requirement for the operation space for assembly and disassembly can be reduced. After the first element 10 is separated from the second element 20, it is necessary to pull the first element 10 downward and take the first element 10 out of an accommodation cavity 211.

The moving space 213 is formed by recessing from the lower end surface of the second main body 21, and the second main body 21 encloses the accommodation cavity 211, and the first main body 11 is sleeved in the accommodation cavity 211. The moving space 213 is communicated with the accommodation cavity 211. This example may be aimed at two parts sleeved with each other.

The first elastic engaging portion 12 is disposed to be inclined outwards. Specifically, as illustrated in FIG. 1, the first elastic engaging portion 12 includes a main body portion 121 and a convex portion 122 which are connected to each other, and a width of the convex portion 122 is greater than that of the main body portion 121. The main body portion 121 and the convex portion 122 can be integrally formed, and the first elastic engaging portion 12 can also be integrally formed with the first main body 11. One end of the main body portion 121 is connected to an edge of the first main body 11, and the convex portion 122 is disposed at the other end of the main body portion 121. The main body portion 121 and the convex portion 122 are inclined outward as a whole. The first main body 11 can have an annular structure. The outward direction here refers to a direction away from a center of the first main body 11 or a direction away from the accommodation cavity 211. The advantage of the first elastic engaging portion 12 inclining outwards is: because the first main body 11 is disposed in the accommodation cavity 211, the first elastic engaging portion 12 inclines outwards, so that the first elastic engaging portion 12 is easy to enter the moving space 213, as the first element 10 continues to be pushed upwards, the convex portion 122 is easily clamped between the second engaging portion 22 and the clamping surface 212.

The clamping surface 212 at least includes a part of inclined surface, or the clamping surface 212 can also be an entire inclined surface. The specific occupation ratio of the inclined surface in the clamping surface 212 can be set according to need. It can be set on the condition that when assembling the first element 10 and the second element 20, the clamping surface 212 can reliably clamp the convex portion 122, and when disassembling the first element 10 and the second element 20, the convex portion 122 can also be smoothly separated from the clamping surface 212.

The inclined surface of the clamping surface 212 is a first inclined surface 2121, the first inclined surface 2121 inclines toward the accommodation cavity 211, that is, an upper end of the first inclined surface 2121 is closer to the center of the accommodation cavity 211 relative to a lower end of the first inclined surface. When the first element 10 and the second element 20 are disassembled, the first element 10 is pushed upward continuously, under the guidance of the first inclined surface 2121, the first elastic engaging portion 12 can move inward and upward more smoothly.

In order to further improve the smoothness of the inward and upward movement of the first elastic engaging portion 12, a surface of the convex portion 122 matching with the clamping surface 212 is also an inclined surface, and the inclined surface of the convex portion 122 is a second inclined surface 1221, and an upper end of the second inclined surface 1221 is closer to the center of the accommodation cavity 211 relative to a lower end of the second inclined surface. The first inclined surface 2121 and the second inclined surface 1221 can be disposed in parallel, or an included angle can be formed between the first inclined surface 2121 and the second inclined surface 1221.

The second engaging portion 22 includes two elastic bodies 221, the two elastic bodies 221 are respectively connected to two side walls of the moving space 213, and the two elastic bodies 221 are spaced apart from each other to form a gap. The elastic body 221 is made of an elastic material. The elastic body 221 can be integrally formed with the second main body 21. The elastic body 221 extends a distance from the side wall of the moving space 213 toward a side surface of the main body 121, and then bends and extends a distance toward a lower surface of the convex portion 122. One end of the elastic body 221 is connected to the side wall of the moving space 213, and an end surface of the other end of the elastic body is opposite to the clamping surface 212 and is spaced apart from the clamping surface 212. The convex portion 122 is clamped between the end surface of the other end of the elastic body 221 and the clamping surface 212.

The width of the main body 121 is L1, the width of the gap is L2, L1 is greater than L2, and the width of the convex portion 122 is also greater than L2. The advantage of the abovementioned dimensional relationship is that: after the first element 10 and the second element 20 are detached so that the first elastic engaging portion 12 is separated from the second engaging portion 22 and the clamping surface 212, upon the first element 10 being pulled down, the first elastic engaging portion 12 will not enter the space between the second engaging portion 22 and the clamping surface 212 again, so as to improve the smoothness of separating the first element 10 from the second element 20.

The elastic body 221 of this example has the advantage that the elastic body can deform to a certain degree when being squeezed because of its elasticity, so that the first elastic engaging portion 12 can more easily pass through the gap and then be clamped between the elastic body 221 and the clamping surface 212. Upon the first element 10 and the second element 20 being detached, the first elastic engaging portion 12 is also easier to separate from the elastic body 221 and the clamping surface 212, that is, the second engaging portion 22 is formed by two opposite elastic bodies 221, which can increase the smoothness of assembling and disassembling the first element 10 and the second element 20. The elastic body 221 is disposed in the moving space 213, which not only saves space, but also has a deformation space, and no additional space is needed for the elastic body 221 to deform.

The first element 10 includes a first pre-connection portion 13 deviating from the first elastic engaging portion 12, and the second element 20 includes a second pre-connection portion 23 deviating from the second engaging portion 22, and the first pre-connection portion 13 is detachably connected to the second pre-connection portion 23. The advantage is that the first pre-connection portion 13 and the second pre-connection portion 23 can be connected first, and then the first element 10 can be pushed upwards, so that the first elastic engaging portion 12 passes through the gap between the two elastic bodies 221 and is clamped between the elastic body 221 and the clamping surface 212, thus completing the assembly of the first element 10 and the second element 20. The advantage of the first pre-connection portion 13 and the second pre-connection portion 23 is that the assembly reliability of the first element 10 and the second element 20 can be improved, so that there is no need to additionally provide a set of the first elastic engaging portion 12 and the second engaging portion 22. In addition, the structures of the first pre-connection portion 13 and the second pre-connection portion 23 can be relatively simple, so that the connection and separation between the first pre-connection portion 13 and the second pre-connection portion 23 are easier, and the convenience of assembling and disassembling the first element 10 and the second element 20 can be improved.

Figure 5:
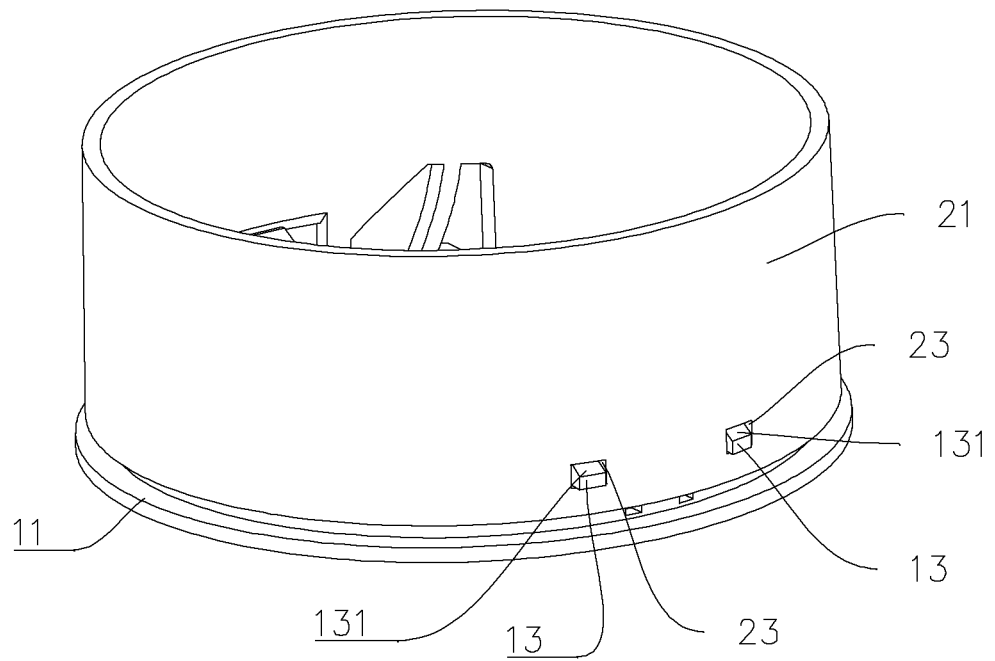
FIG. 5 is a stereoscopic view of an assembly component of the first example of the present disclosure in another viewing angle.

As illustrated in FIG. 5, the first pre-connection portion 13 is an elastic block connected to the first main body 11, and the second pre-connection portion 23 is a clamping space disposed on an inner wall of the second element 20, and the elastic block is clamped into the clamping space. The clamping space may be a through hole, and the elastic block extends out of the second main body 21 from the clamping space. In this case, an area clamped between the elastic block and the second main body 21 is relatively large, which is beneficial to improving the reliability of clamping.

An upper surface of the first pre-connection portion 13 can be an inclined surface, and the inclined surface of the elastic block is a third inclined surface 131. The third inclined surface 131 can make it easier for the first pre-connection portion 13 to enter the clamping space, and to be separated from the clamping space upon the first element 10 being pushed upward in a case where the first element 10 and the second element 20 are disassembled.

The first main body 11 includes a limiting space 111 deviating from the first elastic engaging portion 12 and the first pre-connection portion 13, and the limiting space 111 can be formed by recessing from an outer peripheral surface of the first main body 11. The limiting space 111 is provided with a limiting step 113, and the second element 20 includes an elastic limiting arm 24 deviating from the second engaging portion 22 and the second pre-connection portion 23, and the elastic limiting arm 24 is connected to the second main body 21. The second main body 21 has a deformation space 214 recessed from the end surface. One end of the elastic limiting arm 24 is connected to a bottom wall of the deformation space 214, and the other end of the elastic limiting arm is a free end. The elastic limiting arm 24 is disposed in the deformation space 214 for the elastic limiting arm 24 to deform. The elastic limiting arm 24 can be integrally formed with the second main body 21.

Figure 2:
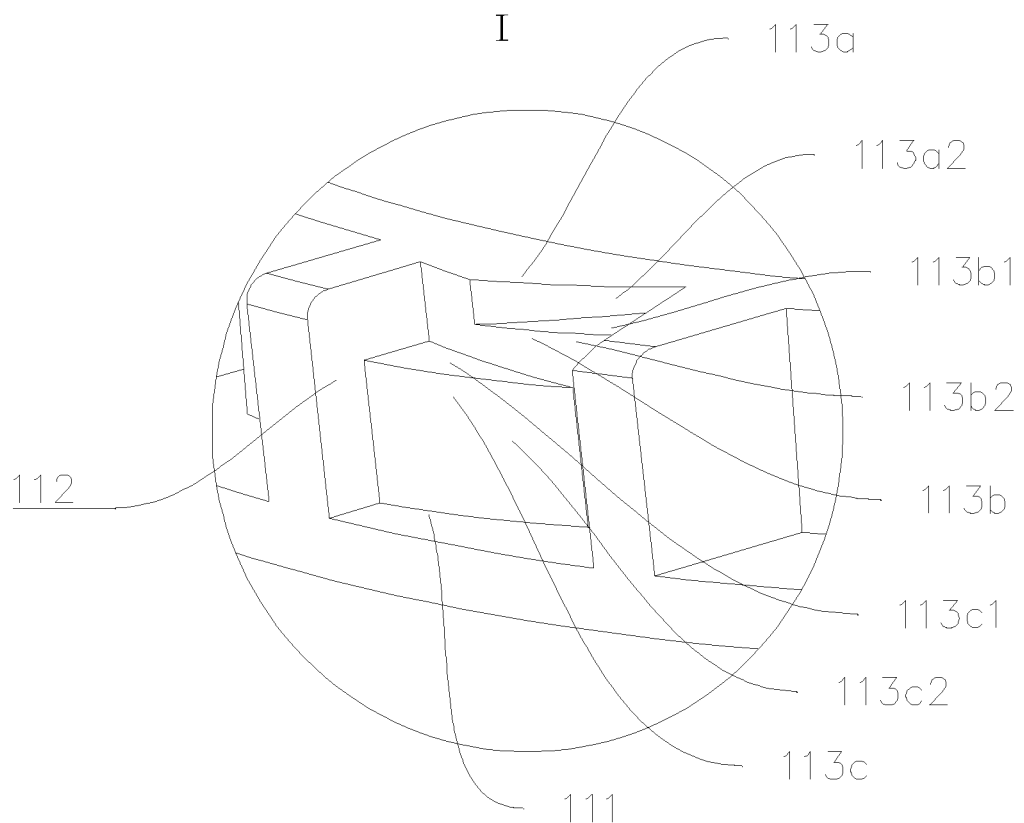
FIG. 2 is a partial enlarged view of FIG. 1 at position I.
Figure 3:
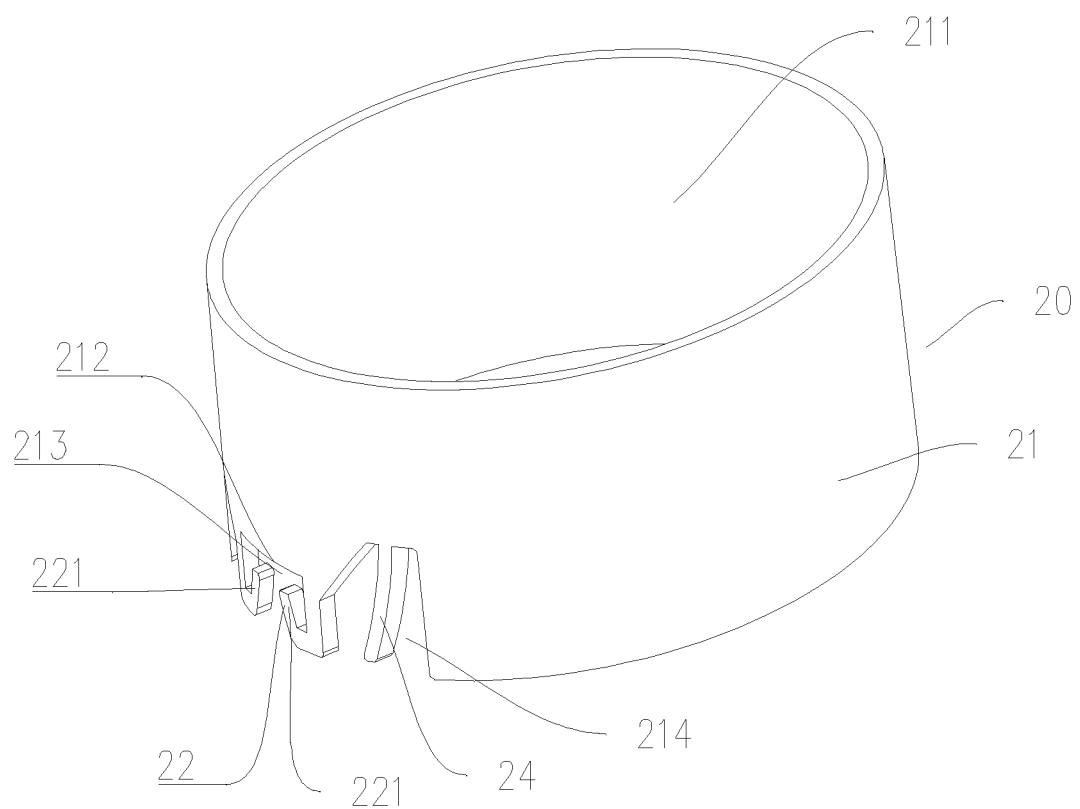
FIG. 3 is a stereoscopic view of a second element of the first example of the present disclosure.

As illustrated in FIG. 2, one side wall of the limiting space 111 forms a blocking wall 112, and the blocking wall 112 can also be formed by another side wall. The limiting step 113 includes three steps, from top to bottom, the three steps are respectively a first step 113a, a second step 113b and a third step 113c. A side surface of the first step 113a is a first guide side surface 113a2, an upper surface of the second step 113b is a first guide bottom surface 113b1, a side surface of the second step 113b is a second guide side surface 113b2, and an upper surface of the third step 113c is a second guide bottom surface 113c1, and a side surface of the third step 113c is a first limiting side surface 113c2. An area of the first guide bottom surface 113b1 decreases gradually in a direction toward the blocking wall 112, which may or may not decrease to zero, as long as the elastic limiting arm 24 can slide down to the next limiting step 113 when reaching the minimum area. The area of the second guide bottom surface 113c1 decreases gradually in the direction away from the blocking wall 112, which may or may not decrease to zero, as long as the elastic limiting arm 24 can slide down to the next limiting step 113 when reaching the minimum area.

Figure 6:
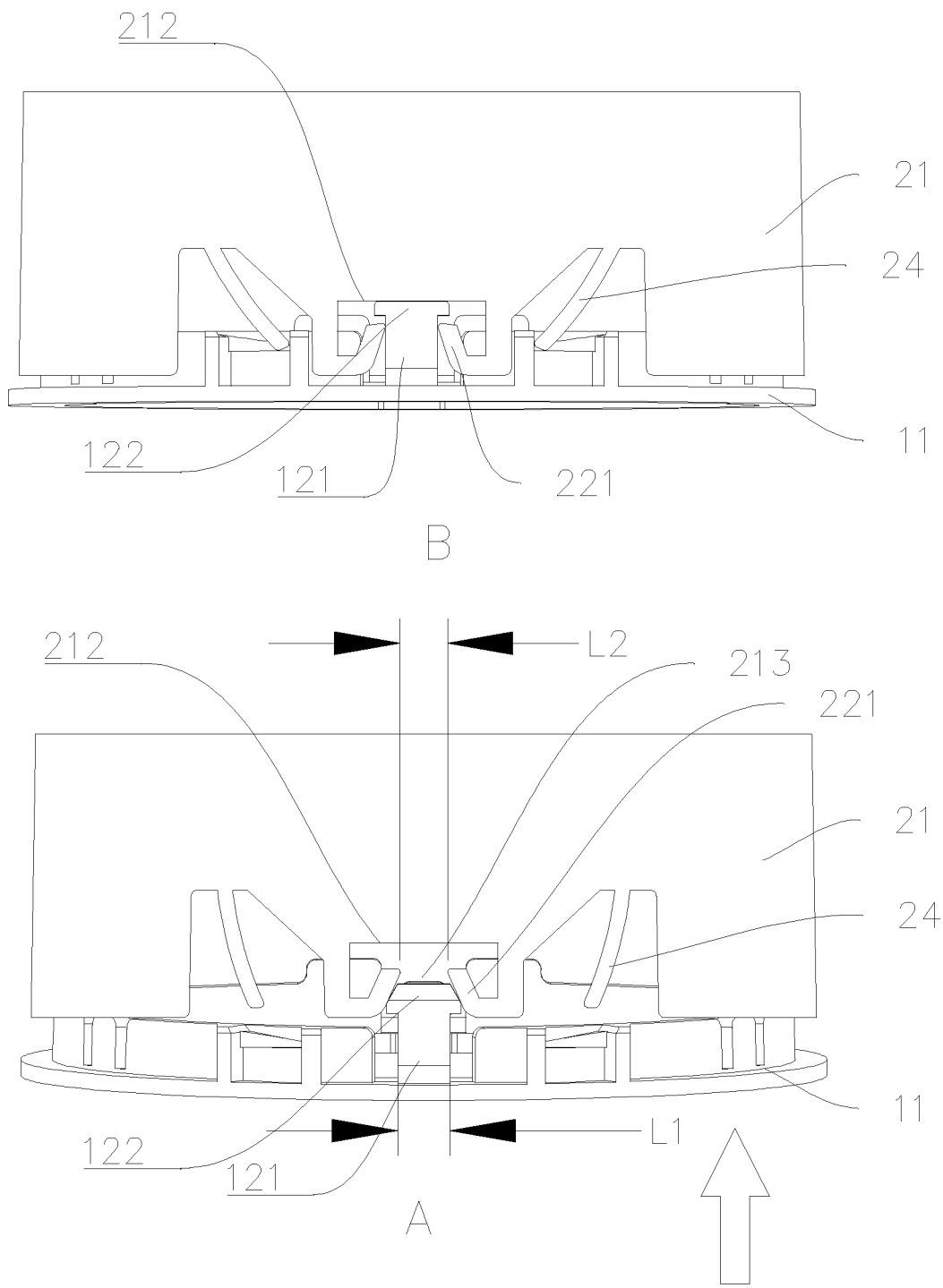
FIG. 6 is an external structural diagram of a first element and a second element in the first example of the present disclosure during an assembly process.
Figure 7:
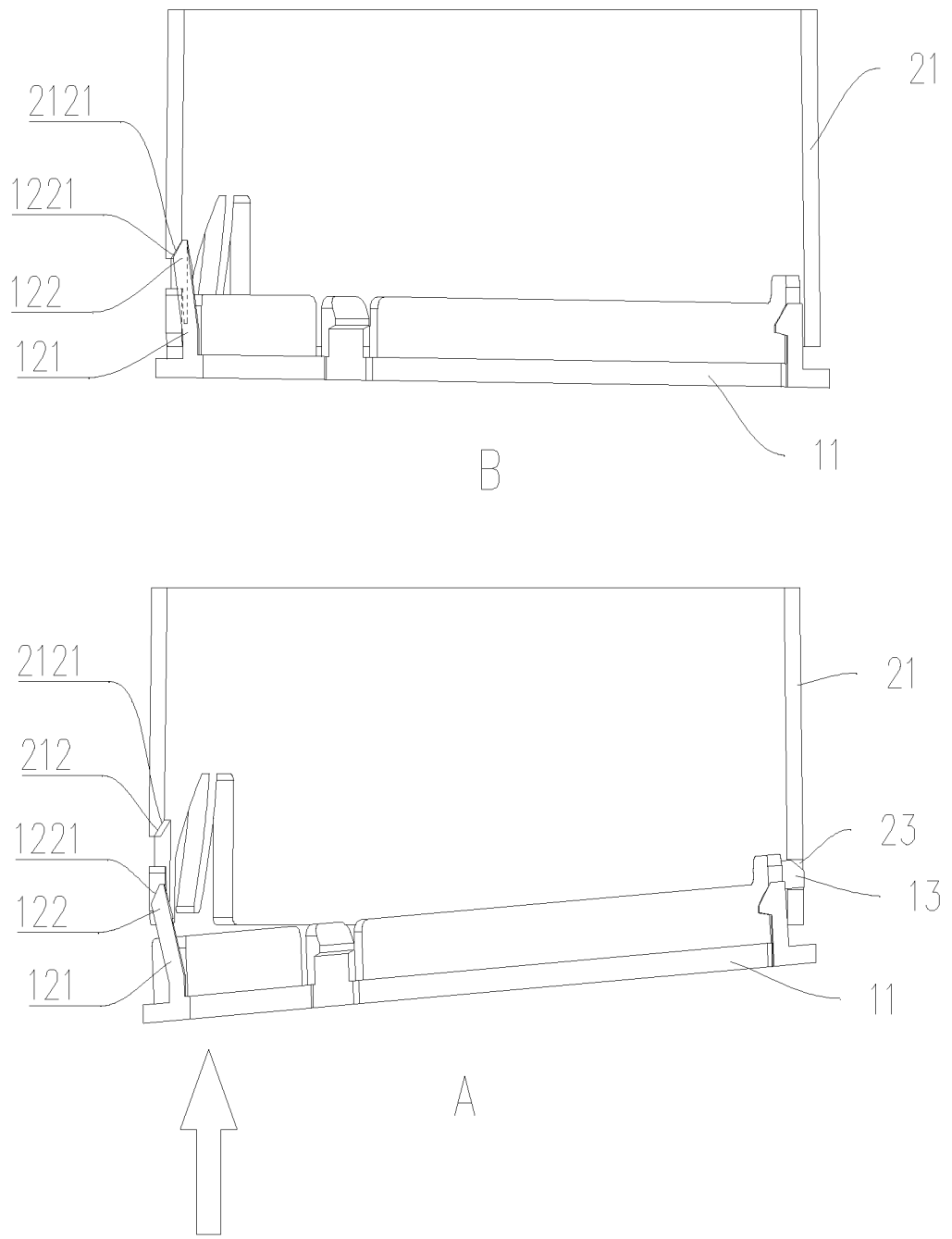
FIG. 7 is an internal structural diagram of a first element and a second element in the first example of the present disclosure during an assembly process.

As illustrated in FIG. 6 and FIG. 7, FIG. A in FIG. 6 and FIG. A in FIG. 7 illustrate the first step of assembly, and FIG. B in FIG. 6 and FIG. B in FIG. 7 illustrate the second step of assembly. The assembly process is as follows:

Step 1: making the first element 10 inclined relative to the second element 20, connecting the first pre-connection portion 13 and the second pre-connection portion 23 together, and then pushing the first element 10 upwards, and moving the first elastic engaging portion 12 toward the clamping surface 212 through the gap between the two elastic bodies 221.

Figure 8:
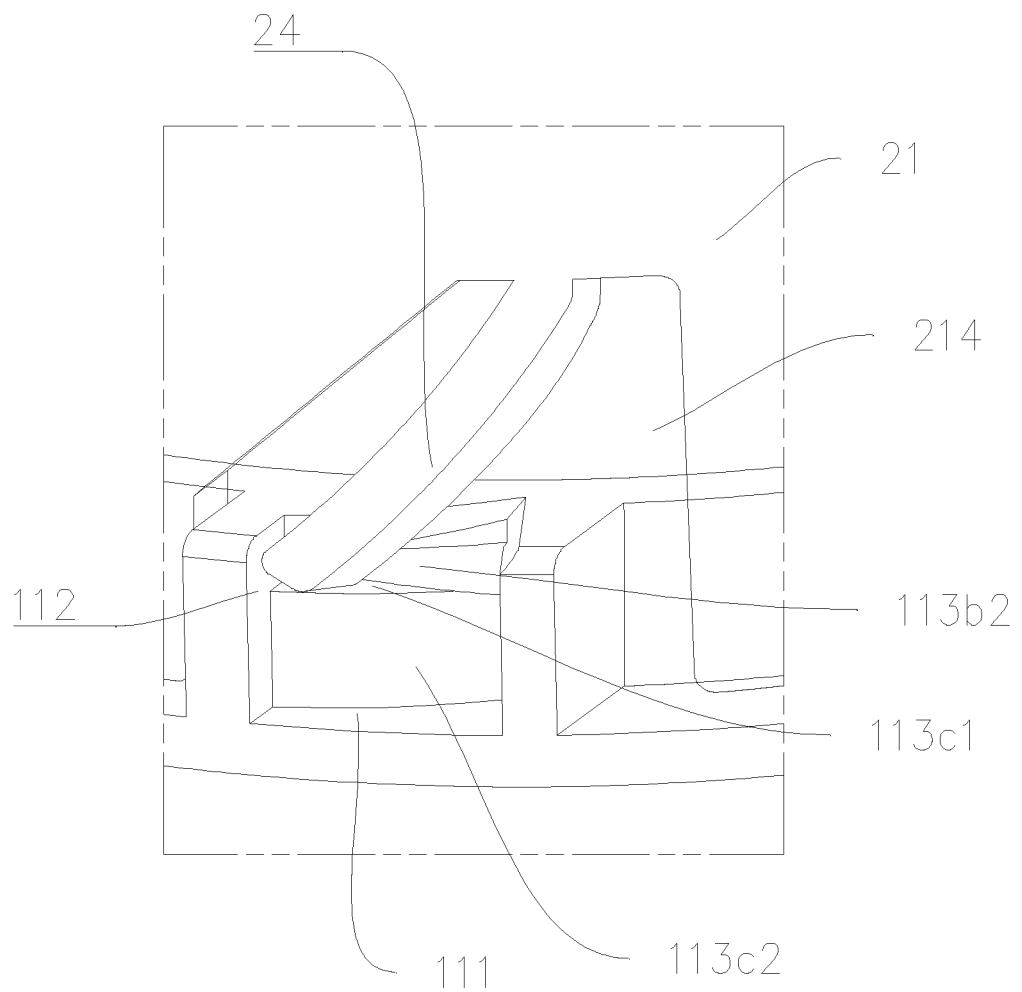
FIG. 8 is a partial structural diagram of a first element and a second element in the first example of the present disclosure during an assembly process.

Step 2: clamping the convex portion 122 between the elastic body 221 and the clamping surface 212. In this process, as illustrated in FIG. 2 and FIG. 8, the outer end of the elastic limiting arm 24 abuts against the first guide bottom surface 113b1 and moves toward the blocking wall 112 under the guidance of the first guide side surface 113a2. Because the area of the first guide bottom surface 113b1 gradually decreases, upon the outer end of the elastic limiting arm 24 reaching the minimum area position of the first guide bottom surface 113b1, the area of the first guide bottom surface 113b1 is too small to support the outer end of the elastic limit arm 24, and the outer end of the elastic limiting arm 24 falls down to the second guide bottom surface 113c1 and abuts against the second guide bottom surface 113c1, and then the outer end of the elastic limiting arm 24 continues to move toward the blocking wall 112 until it is limited by the blocking wall 112 and cannot move any further. At this time, an operator cannot continue to push the first element 10 upward, that is, the assembly of the first element 10 and the second element 20 is completed.

Figure 9:
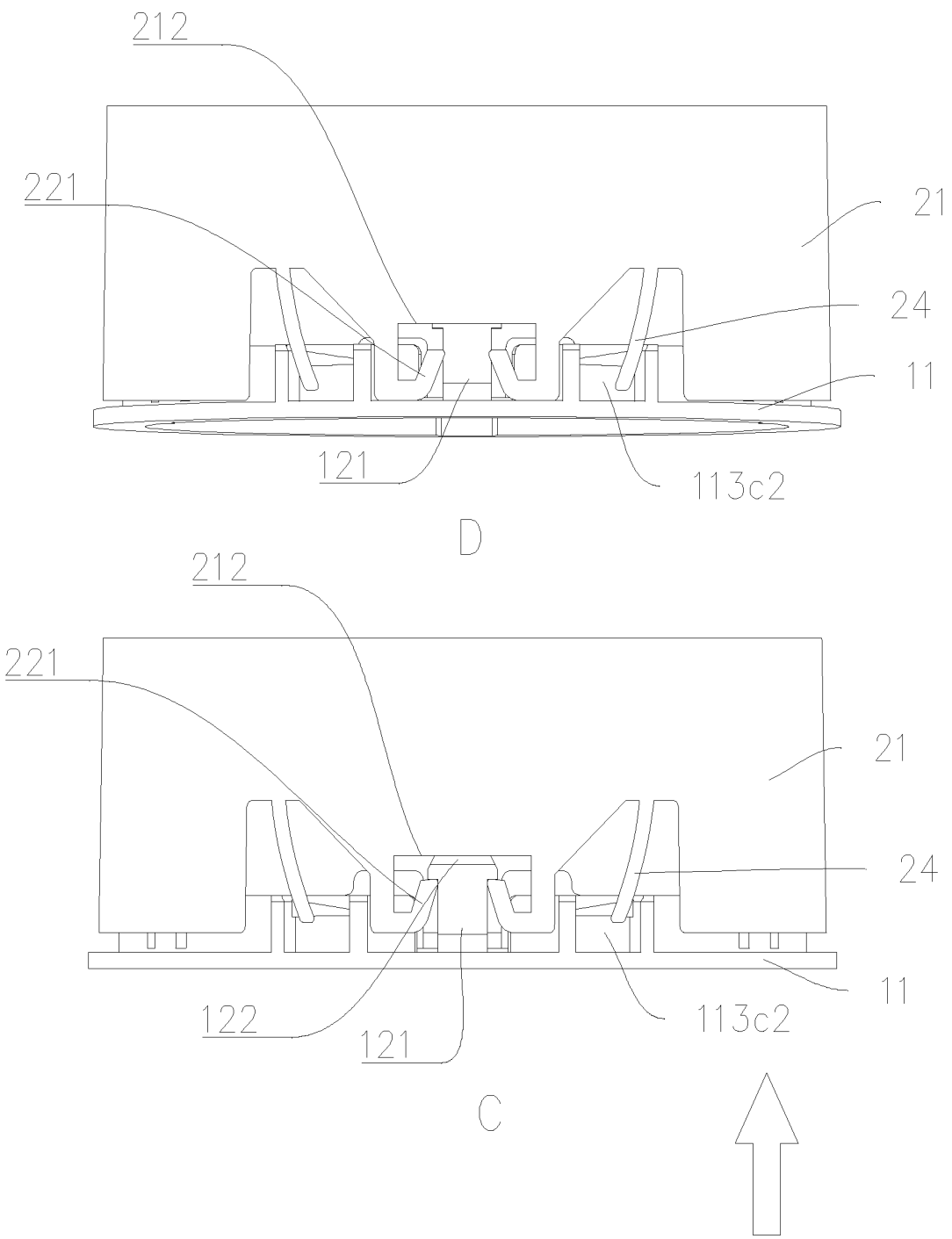
FIG. 9 is an external structural diagram of a first element and a second element in the first example of the present disclosure during a disassembly process.
Figure 10:
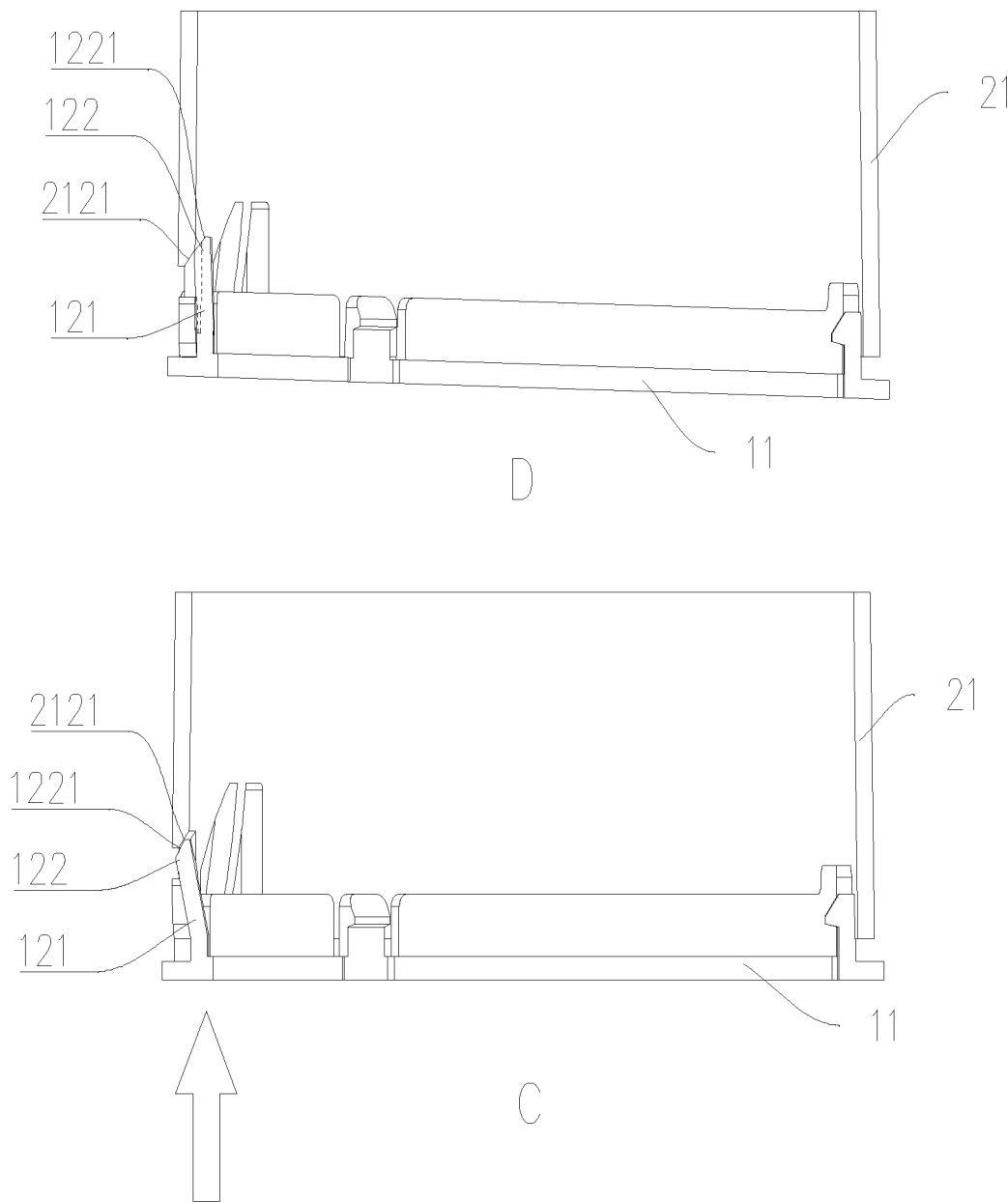
FIG. 10 is an internal structural diagram of a first element and a second element in the first example of the present disclosure during a disassembly process.

After the operator stops pushing the first element 10 upward and releases the first element 10, the elastic limiting arm 24 starts to rebound. Under the guidance of the second guide side surface 113b2, the outer end of the elastic limiting arm 24 moves away from the blocking wall 112. Because the area of the second guide bottom surface 113c1 decreases gradually in the direction away from the blocking wall 112, when moving to the minimum area position of the second guide bottom surface 113c1, the area of the second guide bottom surface 113c1 is too small to support the outer end of the elastic limiting arm 24, and the outer end of the elastic limiting arm 24 falls down to the first limiting side surface 113c2. And as illustrated in FIGS. 9 and 10, during subsequent disassembly process and the process of taking out the first element 10 from the accommodation cavity 211, the elastic limiting arm 24 is always limited outside the first limiting side surface 113c2. FIG. C in FIG. 9 and FIG. C in FIG. 10 are structural diagrams at the initial stage of disassembly. FIG. D in FIG. 9 and FIG. D in FIG. 10 are structural diagrams at the end stage of disassembly, illustrating the structural diagram that the first elastic engaging portion 12 is going to be separated from the second engaging portion 22 and the clamping surface 212.

The functions of the limiting space 111, the limiting step 113 and the elastic limiting arm 24 are: when assembling the first element 10 and the second element 20 and when the assembly is completed, it is possible to prevent the operator from continuously pushing the first element 10 upward and mistakenly detaching the first element 10 from the second element 20. That is, the functions of the limiting space 111, the limiting step 113 and the elastic limiting arm 24 are to prevent misoperation and improve the assembly convenience of the first element 10 and the second element 20. The limiting space 111, the limiting step 113, and the elastic limiting arm 24 do not work in the subsequent disassembly process and the process of taking out the first element 10 from the accommodation cavity 211.

Sometimes, the elastic limiting arm 24 inclines toward the blocking wall 112, which can make it easy for the elastic limiting arm 24 to move toward the blocking wall 112 on the first guide bottom surface 113b1 at the initial stage of assembling the first element 10 and the second element 20, and also provides a basis for a series of subsequent actions of the elastic limiting arm 24. A setting mode of the elastic limiting arm 24 inclining toward the blocking wall 112 can improve the effect of preventing misoperation of the elastic limiting arm 24 and improve the assembly convenience of the first element 10 and the second element 20.

In this example, the first element 10 and the second element 20 are easy to assemble and disassemble, which can be completed manually without tools. In addition, during the disassembly process, the first element 10 and the second element 20 are not damaged and can be reused.

The above illustrates one example. In other examples, the first elastic engaging portion 12 can include a main body 121 and a convex portion 122, the main body 121 is vertically disposed, the convex portion 122 is connected to the outer surface of the main body 121, and the convex portion 122 can also enter the gap between the two elastic bodies 221. As the first element 10 is pushed upward, the convex portion 122 can also be clamped between the second engaging portion 22 and the clamping surface 212. The first elastic engaging portion 12 can also be other structures, as long as when assembling the first element 10 and the second element 20, part of the first elastic engaging portion 12 can pass through the gap between the two elastic bodies 221, and as the first element 10 is pushed upward, part of the first elastic engaging portion 12 can be clamped between the second engaging portion 22 and the clamping surface 212. In addition, when the first element 10 and the second element 20 are detached, after the first elastic engaging portion 12 is separated from the second engaging portion 22 and the clamping surface 212, upon the first element 10 being pulled down, as long as the first elastic engaging portion 12 will not enter the space between the second engaging portion 22 and the clamping surface 212 again.

In other examples, the clamping surface 212 can do not include an inclined surface, and the convex portion 122 includes an inclined surface. Alternatively, both the clamping surface 212 and the convex portion 122 do not include inclined surfaces, and the clamping surface 212 and the convex portion 122 are matched so that the clamping surface 212 can limit the first elastic engaging portion 12 in the outward direction.

In other examples, a gap is formed between the second engaging portion 22 and the second main body 21. For example, the number of elastic body 221 can be one, and a gap is formed between the one elastic body 221 and the side wall of the moving space 213 of the second main body 21. The first elastic engaging portion 12 passes through the gap and is clamped between the second engaging portion 22 and the clamping surface 212 through the gap.

Figure 11:
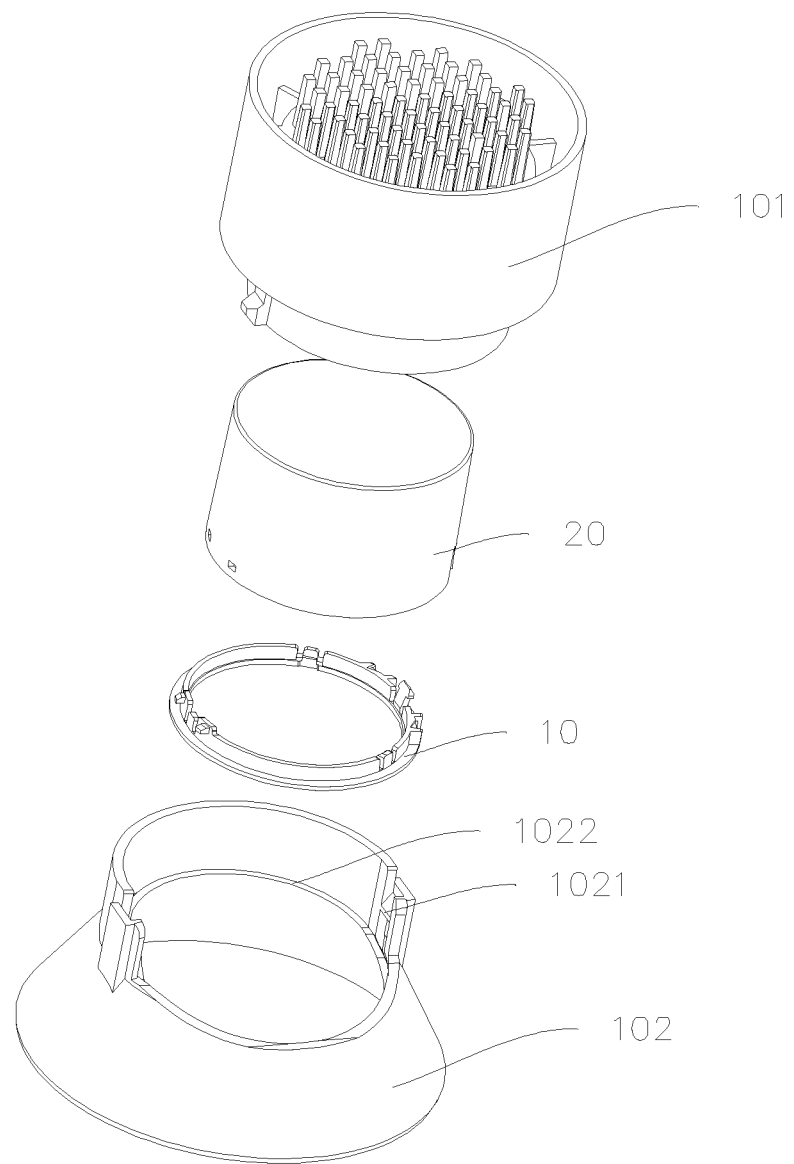
FIG. 11 is an exploded view of a lamp of the second example of the present disclosure.
Figure 12:
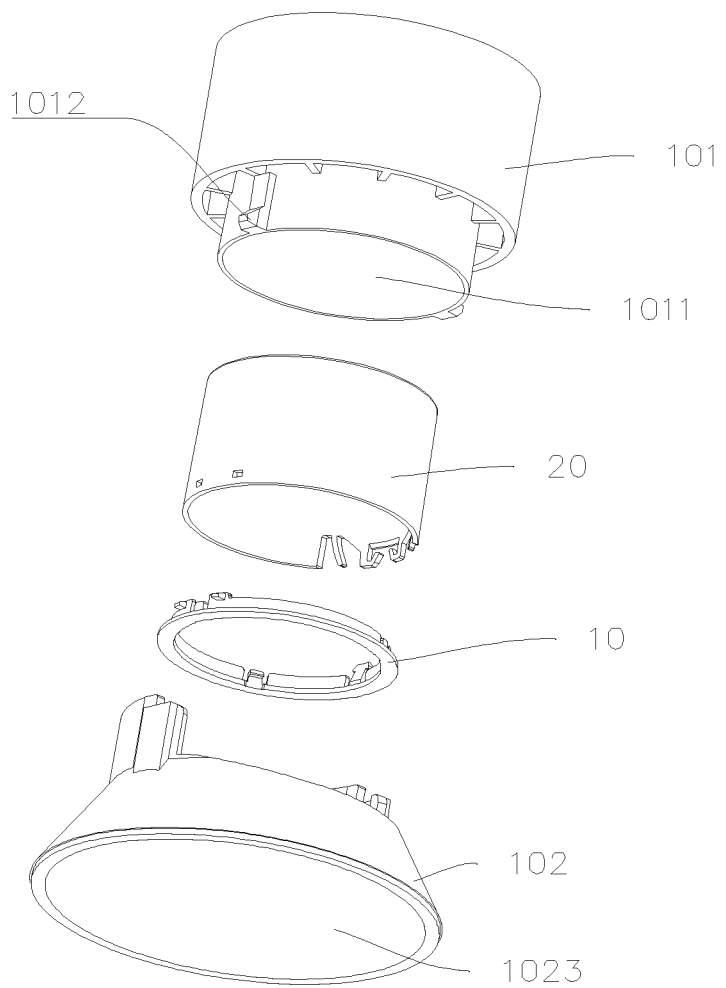
FIG. 12 is an exploded view of a lamp of the second example of the present disclosure in another viewing angle.

As illustrated in FIG. 11 and FIG. 12, this example discloses a lamp, the lamp includes a lamp shell, a light source component and the assembly component of the first example. The lamp shell includes a rear shell 101 and a front shell 102, and the rear shell 101 is detachably connected to the front shell 102. For example, the rear shell 101 is provided with a first clamping portion 1012, and the front shell 102 is provided with a second clamping portion 1021, the first clamping portion 1012 and the second clamping portion 1021 are in clamping fit with each other. After the rear shell 101 is connected with the front shell 102, the rear shell 101 and the front shell 102 together enclose an inner cavity of the lamp shell, and both the assembly component and the light source component are disposed in the inner cavity of the lamp shell.

The rear shell 101 has a mounting cavity 1011 in which the second element 20 is accommodated, and the second element 20 can be connected to the rear shell 101 by screws. As illustrated in FIG. 11, an inner wall of the front shell 102 forms a limiting surface 1022, and after the first element 10 and the second element 20 are connected, the entirety of the first element 10 and the second element 20 is limited between the bottom wall of the rear shell 101 and the limiting surface 1022.

The light source component includes a light source which can be a LED lamp bead. A user can install a filter on the first element 10 by himself, and the light of the light source emits light of a desired color after passing through the filter. The user can also install a light guide sheet on the first element 10 to improve the uniformity of the light of the light source. The user can also install other light distribution elements on the first element 10 by himself. The front shell 102 has a light outlet 1023, and the light of the light source passes through the light distribution element on the first element 10 and then exits from the light outlet 1023. The first element 10 and the second element 20 in this example are convenient to assemble and disassemble. It is convenient for users to install or replace the light distribution element by themselves, and the operation space required for installing or replacing the light distribution element is small.

The present disclosure provides an assembly component, a lamp and a method of manufacturing an assembly component.

An assembly component, including:

a first element, the first element including a first main body and a first elastic engaging portion which are connected to each other;

a second element, the second element including a second main body and a second engaging portion; wherein the second main body has a moving space; a bottom wall of the moving space forms a clamping surface, the second engaging portion is connected to a side wall of the moving space, the first elastic engaging portion is clamped between the second engaging portion and the clamping surface, and the clamping surface limits the first elastic engaging portion in an outward direction.

Preferably, in the abovementioned assembly component, the moving space is formed by recessing from an end surface of the second main body, the second main body encloses an accommodation cavity, and the first main body is sleeved in the accommodation cavity, and the moving space is communicated with the accommodation cavity.

Preferably, in the abovementioned assembly component, the first elastic engaging portion includes a main body portion and a convex portion which are connected to each other, a width of the convex portion is greater than that of the main body portion, and the convex portion is clamped between the second engaging portion and the clamping surface.

Preferably, in the abovementioned assembly component, the first elastic engaging portion is disposed to be inclined outwards.

Preferably, in the abovementioned assembly component, the clamping surface is an inclined surface, or a surface of the first elastic engaging portion matching with the clamping surface is an inclined surface.

Preferably, in the abovementioned assembly component, the second engaging portion includes two elastic bodies, the two elastic bodies are respectively connected to the side wall of the moving space, and a gap is formed between the two elastic bodies.

Preferably, in the abovementioned assembly component, the first elastic engaging portion passes through the gap and is clamped between the second engaging portion and the clamping surface, and a width of the first elastic engaging portion is greater than that of the gap.

Preferably, in the abovementioned assembly component, the first element includes a first pre-connection portion deviating from the first elastic engaging portion, and the second element includes a second pre-connection portion deviating from the second engaging portion, and the first pre-connection portion is detachably connected to the second pre-connection portion.

Preferably, in the abovementioned assembly component, the first pre-connection portion is an elastic block connected to the first main body, the second pre-connection portion is a clamping space disposed on an inner wall of the second element, and the elastic block is clamped into the clamping space.

Preferably, in the abovementioned assembly component, the first main body includes a limiting space deviating from the first elastic engaging portion and a limiting step disposed in the limiting space, the second element includes an elastic limiting arm deviating from the second engaging portion and being connected to the second main body, the elastic limiting arm is in limit fit with the limiting step during an assembly process of the first element and the second element, thereby preventing the first elastic engaging portion from separating from the second engaging portion and the clamping surface.

Preferably, in the abovementioned assembly component, a side wall of the limiting space forms a blocking wall, the limiting step includes a plurality of steps, in directions from top to bottom and from inside to outside, the plurality of steps of the limiting step form a first guide side surface, a first guide bottom surface, a second guide side surface, a second guide bottom surface and a first limiting side surface in sequence, an area of the first guide bottom surface decreases gradually in a direction toward the blocking wall, and an area of the second guide bottom surface decreases gradually in a direction away from the blocking wall, and the elastic limiting arm is limited outside by the first limiting side surface.

Preferably, in the abovementioned assembly component, the elastic limiting arm inclines toward the blocking wall.

Preferably, in the abovementioned assembly component, the second main body has a deformation space formed by recessing from an end surface, one end of the elastic limiting arm is connected to the second main body, and the other end of the elastic limiting arm is a free end, and the elastic limiting arm is disposed in the deformation space.

A lamp includes a lamp shell, a light source component and the assembly component as mentioned above, the assembly component and the light source component are both disposed in an inner cavity of the lamp shell.

The assembly component of the present disclosure has the advantages that when assembling the first element and the second element, the first element is pushed upward until the first elastic engaging portion is clamped between the second engaging portion and the clamping surface, and the assembly of the first element and the second element is completed. In a case where the first element and the second element are disassembled, the first element is pushed upwards continuously, and under the action of the clamping surface, the first elastic engaging portion moves inwards and upwards and then separates from between the second engaging portion and the clamping surface, thus completing the separation of the first element and the second element. The assembling direction and a disassembling direction of the assembly component of the present disclosure are the same, which can further reduce the requirement on the operation space of assembly and disassembly.

The present disclosure provides a method of manufacturing an assembly component. The method may include providing a first element, and connecting a first main body of the first element and a first elastic engaging portion of the first element; providing a second element where the second element may include a second main body and a second engaging portion; providing a moving space for the second main body; forming a clamping surface using a bottom wall of the moving space; connecting the second engaging portion to a side wall of the moving space; clamping the first elastic engaging portion between the second engaging portion and the clamping surface; and limiting the first elastic engaging portion in an outward direction by using the clamping surface.

The method may also include: forming the moving space by recessing from an end surface of the second main body; enclosing an accommodation cavity using the second main body; sleeving the first main body in the accommodation cavity; and communicating the moving space with the accommodation cavity.

The method may include connecting a main body portion of the first elastic engaging portion and a convex portion of the first elastic engaging portion where a width of the convex portion may be greater than that of the main body portion; and clamping the convex portion between the second engaging portion and the clamping surface.

The method may further include: providing a limiting space for the first main body that deviates from the first elastic engaging portion; disposing a limiting step in the limiting space; providing an elastic limiting arm for the second element that deviates from the second engaging portion; and connecting the elastic limiting arm to the second main body where the elastic limiting arm may be in limit fit with the limiting step during an assembly process of the first element and the second element, such that the first elastic engaging portion may be prevented from separating from the second engaging portion and the clamping surface.

The above examples of the present disclosure mainly describe the differences among the various examples, and the different optimization features among the various examples can be combined to form a better example as long as they are not contradictory. Considering the brevity of the writing, it will not be repeated here.

The above are only examples of the present disclosure, and do not limit the present disclosure in any way. For those skilled in the art, the present disclosure can have various modifications and changes.

The invention claimed is:

1. An assembly component, comprising:
a first element, wherein the first element comprises a first main body and a first elastic engaging portion which are connected to each other; and
a second element, wherein the second element comprises a second main body and a second engaging portion; and
wherein the second main body has a moving space, a bottom wall of the moving space forms a clamping surface, the second engaging portion is connected to a side wall of the moving space, the first elastic engaging portion is clamped between the second engaging portion and the clamping surface, and the clamping surface limits the first elastic engaging portion in an outward direction, wherein the first main body comprises a limiting space and a limiting step, and wherein a side wall of the limiting space forms a blocking wall, the limiting step comprises a plurality of steps, in directions from top to bottom and from inside to outside, the plurality of steps of the limiting step form a first guide side surface, a first guide bottom surface, a second guide side surface, a second guide bottom surface and a first limiting side surface in sequence.

2. The assembly component according to claim 1, wherein the moving space is formed by recessing from an end surface of the second main body, the second main body encloses an accommodation cavity, and the first main body is sleeved in the accommodation cavity, and the moving space is communicated with the accommodation cavity.

3. The assembly component according to claim 1, wherein the first elastic engaging portion comprises a main body portion and a convex portion which are connected to each other, a width of the convex portion is greater than that of the main body portion, and the convex portion is clamped between the second engaging portion and the clamping surface.

4. The assembly component according to claim 1, wherein the first elastic engaging portion is disposed to be inclined outwards.

5. The assembly component according to claim 1, wherein the clamping surface is an inclined surface, or a surface of the first elastic engaging portion matching with the clamping surface is an inclined surface.

6. The assembly component according to claim 1, wherein the second engaging portion comprises two elastic bodies, the two elastic bodies are connected to the side wall of the moving space, and a gap is formed between the two elastic bodies.

7. The assembly component according to claim 6, wherein the first elastic engaging portion passes through the gap and is clamped between the second engaging portion and the clamping surface, and a width of the first elastic engaging portion is greater than that of the gap.

8. The assembly component according to claim 1, wherein the first element comprises a first pre-connection portion deviating from the first elastic engaging portion, and the second element comprises a second pre-connection portion deviating from the second engaging portion, and the first pre-connection portion is detachably connected to the second pre-connection portion.

9. The assembly component according to claim 8, wherein the first pre-connection portion is an elastic block connected to the first main body, the second pre-connection portion is a clamping space disposed on an inner wall of the second element, and the elastic block is clamped into the clamping space.

10. The assembly component according to claim 1, wherein the first main body comprises a limiting space deviating from the first elastic engaging portion and the limiting step disposed in the limiting space, the second element comprises an elastic limiting arm deviating from the second engaging portion and being connected to the second main body, the elastic limiting arm is in limit fit with the limiting step during an assembly process of the first element and the second element, such that the first elastic engaging portion is prevented from separating from the second engaging portion and the clamping surface.

11. The assembly component according to claim 10, wherein an area of the first guide bottom surface decreases gradually in a direction toward the blocking wall, and an area of the second guide bottom surface decreases gradually in a direction away from the blocking wall, and the elastic limiting arm is limited outside by the first limiting side surface.

12. The assembly component according to claim 11, wherein the elastic limiting arm inclines toward the blocking wall.

13. The assembly component according to claim 10, wherein the second main body has a deformation space formed by recessing from an end surface, one end of the elastic limiting arm is connected to the second main body, and the other end of the elastic limiting arm is a free end, and the elastic limiting arm is disposed in the deformation space.

14. A lamp, comprising a lamp shell, a light source component and an assembly component, wherein the assembly component comprises:
a first element, wherein the first element comprises a first main body and a first elastic engaging portion which are connected to each other; and
a second element, wherein the second element comprises a second main body and a second engaging portion; and
wherein the second main body has a moving space, a bottom wall of the moving space forms a clamping surface, the second engaging portion is connected to a side wall of the moving space, the first elastic engaging portion is clamped between the second engaging portion and the clamping surface, and the clamping surface limits the first elastic engaging portion in an outward direction; and
the assembly component and the light source component are both disposed in an inner cavity of the lamp shell, wherein the first main body comprises a limiting space and a limiting step, and wherein a side wall of the limiting space forms a blocking wall, the limiting step comprises a plurality of steps, in directions from top to bottom and from inside to outside, the plurality of steps of the limiting step form a first guide side surface, a first guide bottom surface, a second guide side surface, a second guide bottom surface and a first limiting side surface in sequence.

15. The lamp according to claim 14, wherein the moving space is formed by recessing from an end surface of the second main body, the second main body encloses an accommodation cavity, and the first main body is sleeved in the accommodation cavity, and the moving space is communicated with the accommodation cavity.

16. The lamp according to claim 14, wherein the first elastic engaging portion comprises a main body portion and a convex portion which are connected to each other, a width of the convex portion is greater than that of the main body portion, and the convex portion is clamped between the second engaging portion and the clamping surface.

17. A method of manufacturing an assembly component, comprising:
providing a first element, and connecting a first main body of the first element and a first elastic engaging portion of the first element;
providing a second element wherein the second element comprises a second main body and a second engaging portion;
providing a moving space for the second main body;
forming a clamping surface using a bottom wall of the moving space;
connecting the second engaging portion to a side wall of the moving space;
clamping the first elastic engaging portion between the second engaging portion and the clamping surface; and
limiting the first elastic engaging portion in an outward direction by using the clamping surface, wherein the first main body comprises a limiting space and a limiting step, and wherein a side wall of the limiting space forms a blocking wall, the limiting step comprises a plurality of steps, in directions from top to bottom and from inside to outside, the plurality of steps of the limiting step form a first guide side surface, a first guide bottom surface, a second guide side surface, a second guide bottom surface and a first limiting side surface in sequence.

18. The method of claim 17, further comprising:
forming the moving space by recessing from an end surface of the second main body;
enclosing an accommodation cavity using the second main body;
sleeving the first main body in the accommodation cavity; and
communicating the moving space with the accommodation cavity.

19. The method of claim 17, further comprising:
connecting a main body portion of the first elastic engaging portion and a convex portion of the first elastic engaging portion wherein a width of the convex portion is greater than that of the main body portion; and
clamping the convex portion between the second engaging portion and the clamping surface.

20. The method of claim 17, further comprising:
providing the limiting space for the first main body that deviates from the first elastic engaging portion;
disposing the limiting step in the limiting space;
providing an elastic limiting arm for the second element that deviates from the second engaging portion; and
connecting the elastic limiting arm to the second main body, wherein the elastic limiting arm is in limit fit with the limiting step during an assembly process of the first element and the second element, such that the first elastic engaging portion is prevented from separating from the second engaging portion and the clamping surface.

* * * * *